US007089568B2

(12) United States Patent
Yoshida et al.

(10) Patent No.: US 7,089,568 B2
(45) Date of Patent: Aug. 8, 2006

(54) PROGRAM CONTROL METHOD, COMPUTER SYSTEM, CONTROL PROGRAM, AND STORAGE MEDIUM STORING THE CONTROL PROGRAM

(75) Inventors: Jun Yoshida, Kawasaki (JP); Tetsuya Hashimoto, Tokyo (JP); Nobuyuki Yamamoto, Yokohama (JP); Yuji Yamamoto, Yokohama (JP); Nobuo Beniyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 862 days.

(21) Appl. No.: 10/058,780

(22) Filed: Jan. 30, 2002

(65) Prior Publication Data
US 2003/0084203 A1      May 1, 2003

(30) Foreign Application Priority Data
Oct. 26, 2001    (JP)    .............................. 2001-328505

(51) Int. Cl.
G06F 9/54    (2006.01)
(52) U.S. Cl. ........................ 719/330; 719/313; 719/316
(58) Field of Classification Search ......... 719/310–332
See application file for complete search history.

(56) References Cited

U.S. PATENT DOCUMENTS 6,256,676 B1 *  7/2001  Taylor et al. ............... 709/246

6,738,975 B1 *  5/2004  Yee et al. ................... 719/310

FOREIGN PATENT DOCUMENTS

JP    A-2001-016274    1/2001

OTHER PUBLICATIONS

"The Workflow Reference Model, TC00-1003 (1995)", Chapter 2, pp. 6-18, published by Workflow Management Coalition.
"Enterprise JavaBeans Specification, vl. 1 (1999)", from Chapter 3 to Chapter 4, pp. 21-38, published by Sun Microsystems, Inc. of the United States.
"J2EE Connector Architecture Specification, Version 1.0, Proposed Final Draft #2 (2001)", from Chapter 2 to Chapter 4, pp. 5-16, published by Sun Microsystems, Inc. of the United States.

* cited by examiner

Primary Examiner—Lewis A. Bullock, Jr.
(74) Attorney, Agent, or Firm—Mattingly, Stanger, Malur & Brundidge, P.C.

(57) ABSTRACT

An adapter component capable of connecting to a connector component, and an adapter execution unit for accepting an execution request from an EAI system to initiate the adapter component are provided as an adapter program. With these components, data outputted from the EAI system is received as input, and converted into a format available for the connector component. The converted data is outputted to the connector component.

12 Claims, 10 Drawing Sheets

PROGRAM CONTROL METHOD, COMPUTER SYSTEM, CONTROL PROGRAM, AND STORAGE MEDIUM STORING THE CONTROL PROGRAM

BACKGROUND OF THE INVENTION

The present invention relates to a feature for connecting connector components which wrap predefined interfaces of a plurality of information systems in an EAI system for associating the information systems to provide interfaces for other programs.

In recent years, due to fast changes in businesses, trend to borderless business environments, rapid and oppressive changes in basic industrial systems, and the like, a need exists for a system which is capable of implementing new business services in a short term and at low cost, and also capable of implementing a flexible system configuration which permits immediate supports for such changes. To meet the need, a field called "enterprise application integration" (hereinafter referred to as "EAI") has been growing, mainly led by the United States, for rapidly and securely implementing a new intra-enterprise information system by combining existing enterprise application software packages and existing information system assets using an EAI system. The EAI system is mainly responsible for controlling paths among information systems, and transferring data which flows among the information systems. The processing in each information system is referred to as a "transaction"; and data flowing among information systems as "transaction data".

A first known example of EAI is described in U.S. Pat. No. 6,256,676. In this known example, the EAI system is referred to as a "hub"; each transaction as a "spoke"; and an overall system using the hub as "hub-and-spoke systems".

A second known example of EAI is described in "The Workflow Reference Model, TC00-1003 (1995)", Chapter 2, pp. 6–18, published by Workflow Management Coalition. In this known example, the EAI system is referred to as a "workflow management engine"; each transaction as an "activity"; and an overall system using the workflow management engine as a "workflow management system".

In recent years, some component models, which enable programs to be reused, have also emerged for realizing short-term development of a server program in a distributed object system which is an information processing system that is constructed making use of distributed object technologies. For permitting the reuse of programs, programs are created in conformity to predefined rules in a component model. A program created in this way is referred to as a "component". Since the component can be reused, it can be sold and purchased as a distributable part.

In a system based on the component model, a program which provides a service initiates a component, and a program which utilizes the service invokes the component to accomplish desired processing. Here, each service provided by each component is referred to as a "method"; a program which provides a service as a "service providing program"; and a program which utilizes a service as a "service utilizing program".

A system based on the component model has a problem in a method of acquiring an identifier for a service utilizing program to call a component. Here, an identifier for calling an object or a component is referred to as "reference information". An object for use by a service utilizing program in acquiring reference information on a component is referred to as a "home".

The system based on the component model also requires an infrastructure for executing components. This infrastructure is referred to as an "application server".

A known example of the component model is described, for example, in "Enterprise JavaBeans Specification, v1.1 (1999)", from Chapter 3 to Chapter 4, pp. 21–38, published by Sun Microsystems, Inc. of the United States ("Enterprise JavaBeans" is a registered trademark of Sun Microsystems, Inc. of the United States). In this known example, a component is referred to as "Enterprise Bean"; a home as "EJBHome"; and an application server as "EJB Container" and "EJB server".

Also, some component models are capable of wrapping existing enterprise application software packages and existing information system assets to connect to an existing transaction program from another program in an united method. In this disclosure, this component model is particularly referred to as a "connector component model".

A known example of the connector component model is described, for example, in "J2EE Connector Architecture Specification, Version 1.0, Proposed Final Draft #2 (2001)", from Chapter 2 to Chapter 4, pp. 5–16, published by Sun Microsystems, Inc. of the United States. In this known example, a connector component is referred to as a "connector"; and a home as a "connection factory"; and an application server as an "application server".

Now, description will be made on a method of connecting an existing transaction program to an EAI system using components in the prior art.

Generally, for integrating an existing transaction program into an EAI system, a connecting means referred to as an "adapter program" must be installed in each transaction for connecting the existing transaction program to the EAI system. The adapter program starts, maintains and terminates a connection with the EAI system in accordance with a connection interface for an adapter defined by the EAI system. Therefore, conventionally, a means for managing the state of connection with the EAI system must be installed in the adapter program. The adapter program is also required to have installed therein a means for converting a data structure for input data passed from the EAI system to the adapter program into a data structure for input data to the existing transaction program; and a means for converting a data structure for data outputted from the existing transaction program into a data structure for output data requested by the EAI system. The adapter program is further required to have installed therein a process of starting, executing and terminating a connection with the existing transaction program in consideration of an inherent interface provided by the existing transaction program.

However, by using a connector component for a connection to the existing transaction program, the adapter program need not handle the interface inherent to the existing transaction program, and instead can implement a process of starting, executing and terminating a connection with the connector component in consideration of a united interface.

Also, by using a component as a service utilizing program which utilizes a service provided by the connector component, it is possible to improve the reusability of the adapter program for installation. In this disclosure, this is particularly referred to as an "adapter component".

For developing an adapter program when a connector component has been previously provided, a programmer for developing an adapter program must be fully familiar with a means for managing the state of a connection to an EAI system; a means for utilizing services provided by the connector components; a means for installing component models of the adapter component; a complicated communication interface between respective components; and the like. Also, for converting input data passed from the EAI system to the adapter into a data format required by the connector component, and returning the result of execution to the EAI system, data on the result of execution must be converted into a data format required by the EAI system.

SUMMARY OF THE INVENTION

It is an object of the present invention to provide a program control method for converting input data outputted from an EAI system into a format available for a connector component to deliver the data to the connector component, by providing as an adapter program an adapter component capable of connecting to a connector component, and an adapter execution unit responsive to an execution request from the EAI system for initiating the adapter component.

The adapter program includes: a step of receiving data from an EAI system; a step of acquiring an adapter component reference name with reference to adapter call definition information for calling an adapter component; a step of converting the data into a format which matches an interface for a predetermined adapter component to generate first converted data; a step of passing the first converted data to the adapter component; a step of acquiring a connector reference name with reference to connector call definition information for calling a connector component; a step of converting the first converted data into a format which matches an interface for a predetermined connector component to generate second converted data; and a step of passing the second converted data to a connector component corresponding to the connector reference name.

DETAILED DESCRIPTION OF THE EMBODIMENTS

Now, embodiments of the present invention will be described with reference to the accompanying drawings.

To begin with, a first embodiment will be described with reference to FIGS. 1–8. The first embodiment is intended to solve the following problems which may be experienced in developing an adapter when a connector component has previously been provided.

First, for developing an adapter program when a connector component has been previously provided, a programmer for developing the adapter program must be fully familiar with a means for managing the state of a connection to an EAI system; a means for utilizing services provided by the connector components; a means for installing component models of the adapter component; a complicated communication interface between respective components; and the like. Also, for converting input data passed from the EAI system to the adapter into a data format required by the connector component, and returning the result of execution to the EAI system, data on the result of execution must be converted, conversely, into a data format required by the EAI system.

Also, the adapter component must be installed in each of transactions defined by the EAI system. Even when the same connector component is used in a plurality of transactions, the adapter component must be installed in each of the transactions if different input/output data items are communicated between the EAI system and the adapter, or if a method for responding to an execution request from the EAI system is different from a group of methods provided by the connector component. Further, the installation of the adapter component must be modified in the event of a change in a transaction defined by the EAI system and/or a service provided by the connector component.

The first embodiment is intended for a reduction in the number of steps in system development and for an improved maintenanceability for programs by providing an adapter component capable of connecting to a plurality of connector components, and an adapter execution unit responsive to an execution request from the EAI system to initiate the adapter component.

Next, an overview of the system according to the first embodiment will be described with reference to FIG. 1.

Figure 1:
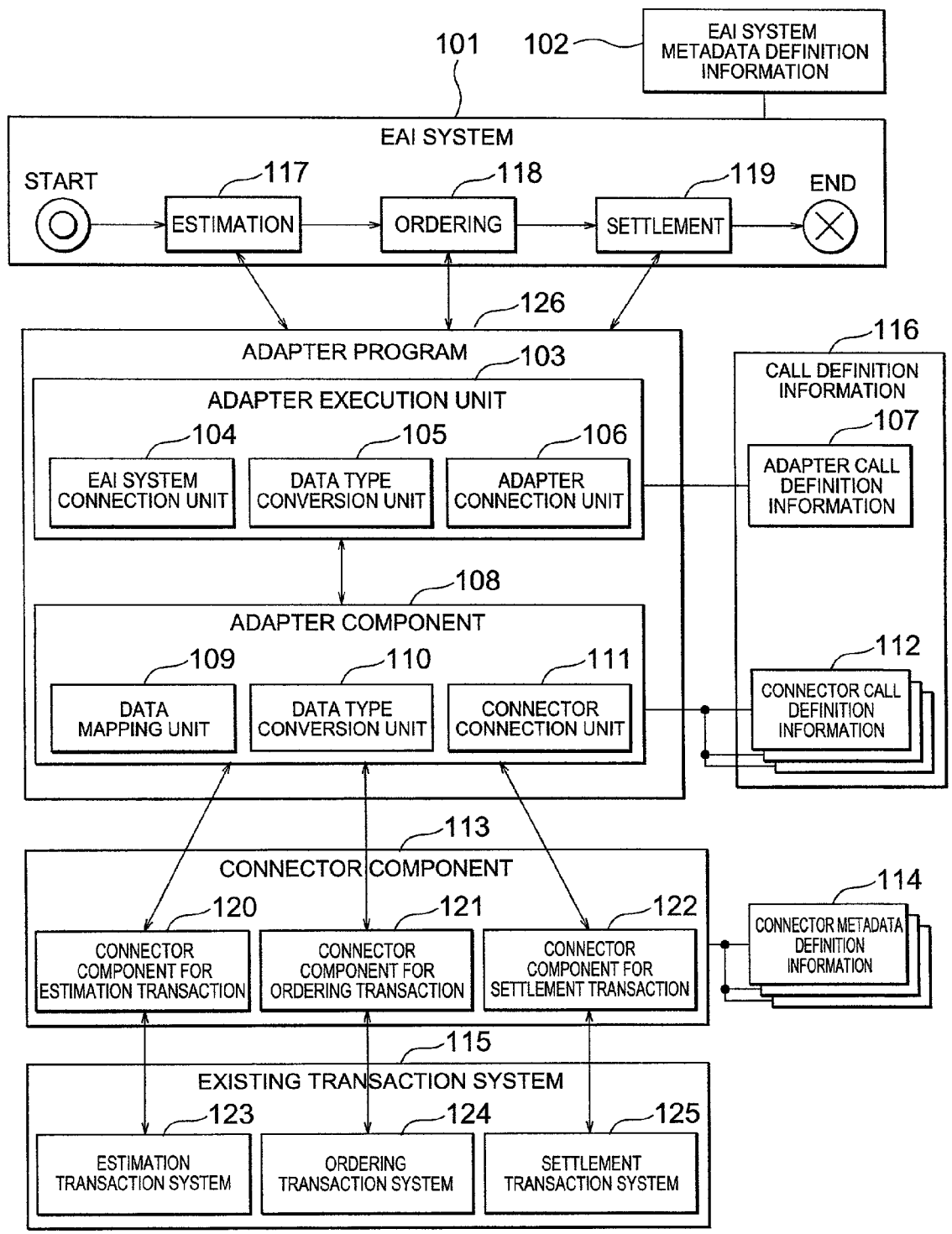
FIG. 1 is a block diagram generally illustrating an execution environment produced in accordance with a first embodiment of the present invention.

FIG. 1 illustrates an EAI system 101, and a group of systems centered on an existing transaction system 115 for executing each transaction. For example, the existing transaction system 115 for making an estimation 117 is an estimation transaction system 123, and a connector component 113 which wraps an interface for the estimation transaction system 123 is an estimation transaction connector component 120. Similarly, the existing transaction system 115 for placing an order 118 is an ordering transaction system 124, and a connector component 113 which wraps an interface for the ordering transaction system 124 is an ordering transaction connector component 121. The existing transaction system 115 for making a settlement 119 is a settlement transaction system 125, and a connector component 113 which warps an interface for the settlement transaction system 125 is a settlement transaction connector component 122.

In this embodiment, adapter call definition information 107 and connector call definition information 112 are generated as a file which can be referenced by an adapter program 126 during execution or as portions of the adapter program 126, by reading EAI system metadata definition information 102 provided by the EAI system 101, reading connector metadata definition information 114 provided by the connector component 113, and prompting a user to select a method for responding to an execution request from the EAI system 101 from among a group of methods provided by the connector components 113. Also, data mapping definition information is produced as a portion of the connector call definition information 112 by prompting the user to map data items with respect to input/output data items defined by the EAI system 101 and input/output data items defined by the connector component 113.

Upon execution, an adapter execution unit 103 is initiated from a particular transaction of the EAI system 101, and input data is passed to the adapter execution unit 103. Next, the initiated adapter execution unit 103 acquires a reference name and transaction identification information (transaction identification name) of an adapter component 108, commonly utilized by a plurality of transactions, from the adapter call definition information 107, and metadata definition information on input/output data. Based on the information, the adapter execution unit 103 converts the input data passed by the EAI system 101 into a format which matches an interface for the adapter component 108 to generate first converted data, calls the adapter component 108 using the reference name of the adapter component 108 to pass the transaction identification name and the first converted data to the adapter component 108. Next, the adapter component 108 selects connector call definition information 112 for calling a connector component 113 for executing a transaction based on the transaction identification name, and acquires a reference name of the connector component 113 and metadata definition information on input/output data from the connector call definition information 112. Based on the information, the adapter component 108 converts the first converted data into a format which matches an interface for the connector component 113 to create second converted data, and calls the connector component 113 using the reference name of the connector component 113 to pass the second converted data to the connector component 113.

Figure 2:
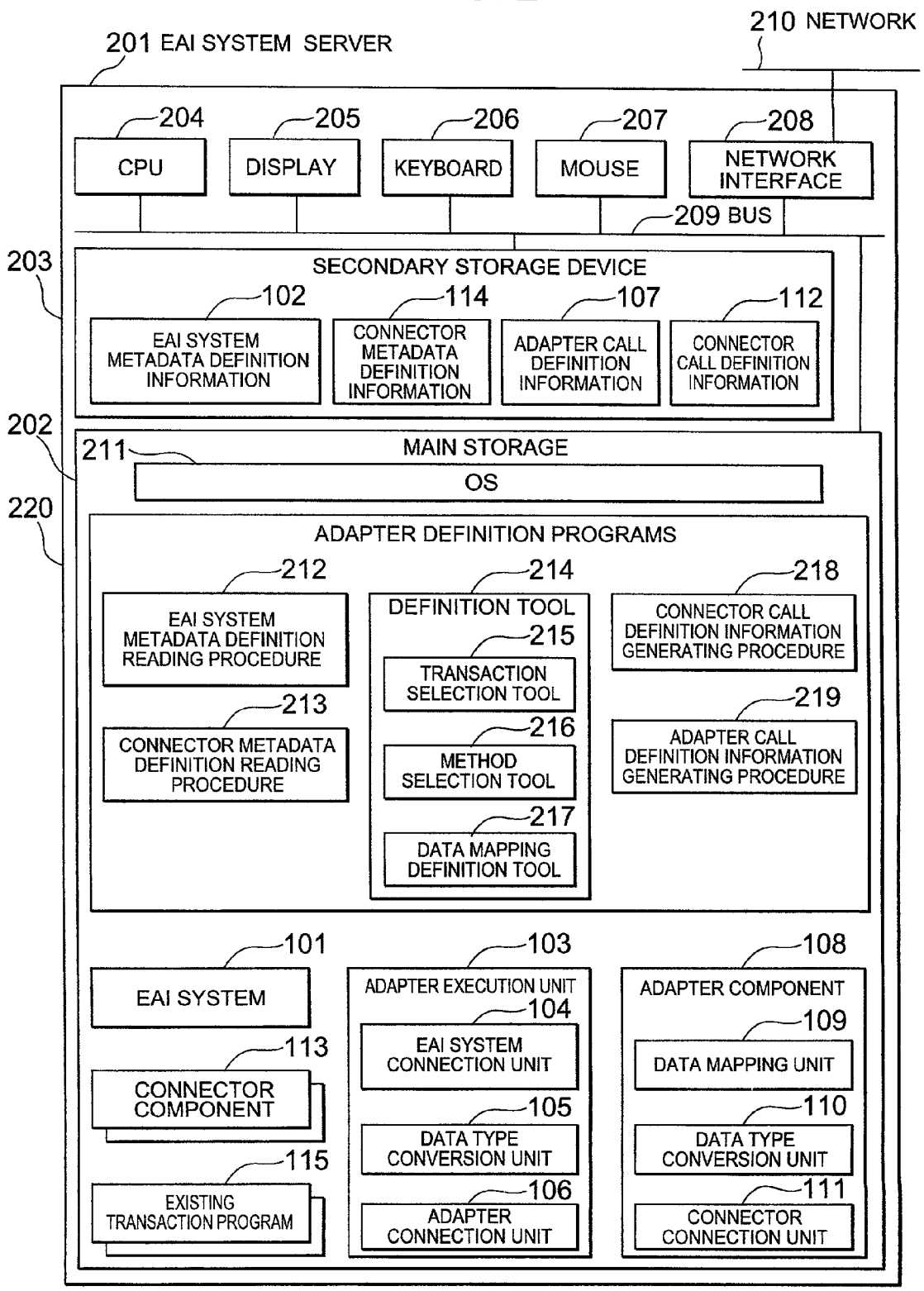
FIG. 2 is a block diagram illustrating a development environment and an execution environment in the first embodiment.

Next, the general configuration of the present system will be outlined with reference to FIG. 2.

FIG. 2 illustrates the configuration of an EAI system server 201 which produces the adapter call definition information 107 and connector call definition information 112 and implements a system centered on the EAI system 101. The EAI system server 201 includes a main storage 202; a secondary storage device 203; a CPU 204; a display 205; a keyboard 206; a mouse 207; a network interface 208; and a bus 209 for interconnecting these components. The EAI system server 201 is connected to a network 210 through the network interface 208.

The main storage 202 stores an operating system (hereinafter referred to as "OS") 211; a group of adapter definition programs 220 for solving the problems addressed by the present invention; the EAI system 101; the connector component 113; the existing transaction program 115; the adapter execution unit 103; and the adapter component 108. The secondary storage device 203 in turn stores the EAI system metadata definition information 102; the connector metadata definition information 114; the adapter call definition information 107; and the connector call definition information 112.

The group of adapter definition programs 220 include an EAI system metadata definition reading procedure 212; a connector metadata definition reading procedure 213; a definition tool 214; a connector call definition information generating procedure 218; and an adapter call definition information generating procedure 219. The EAI system metadata definition reading procedure 212 reads the EAI system metadata definition information 102. The connector metadata definition reading procedure 213 reads connector metadata definition information 111. The definition tool 214 includes a transaction selection tool 215; a transaction processing method selection tool 216; and a data mapping definition tool 217. The transaction selection tool 215 is a tool for allowing the user to select a desired transaction from a group of transactions defined in the EAI system metadata definition information 102. The transaction processing method selection tool 216 is a tool for allowing the user to select a method for responding to an execution request from the EAI system, from a group of methods defined in the connector metadata definition information 114. The data mapping definition tool 217 is a tool for allowing the user to make mapping between input/output data for a transaction selected by the transaction selection tool 215 and input/output data for a transaction processing method selected by the transaction processing method selection tool 216. The connector call definition information generating procedure 218 generates the connector call definition information 112 for the adapter component 108 to call the connector component 113, making use of the connector metadata definition information 114, a transaction selected by the transaction selection tool 215, a transaction processing method selected by the transaction processing method selection tool 216, and the data mapping definition information. The adapter call definition information generating procedure 219 generates the adapter call definition information 107 for the adapter execution unit 103 to call the adapter component 108, making use of the EAI system metadata definition information 102 and a transaction selected by the transaction selection tool 215.

Next, the respective definitions and definition tools will be described in greater detail.

Figure 3:
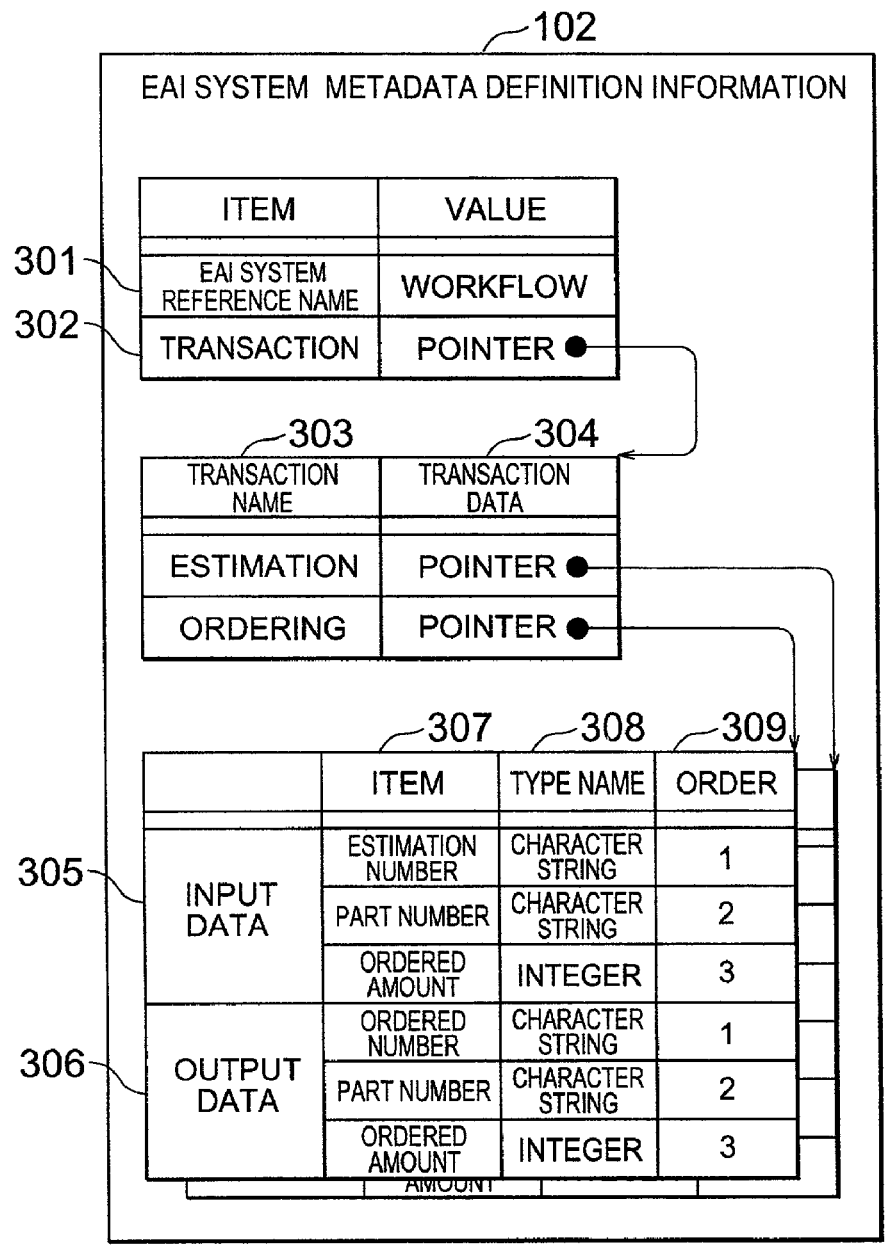
FIG. 3 is a table showing the contents of adapter call definition information.

FIG. 3 shows details of the EAI system metadata definition information 102. The EAI system metadata definition information 102 is comprised of an EAI system reference name 301 for referencing the EAI system 101 from the outside such as the adapter execution unit 103; and a transaction 302 indicative of the contents of each transaction defined on the EAI system 101. The transaction 302 is comprised of a transaction name 303 indicative of the name of the transaction; and transaction data 304 indicative of the contents of transaction data. The transaction data 304 is comprised of input data 305 and output data 306 indicative of input/output data associated with the transaction, and the input data 305 and output data 306 are each comprised of an item 307 indicative of a data name of a data item; a type name 308 indicative the type of the data item; and an order 309 indicative of an order in which the data item appears.

Figure 4:
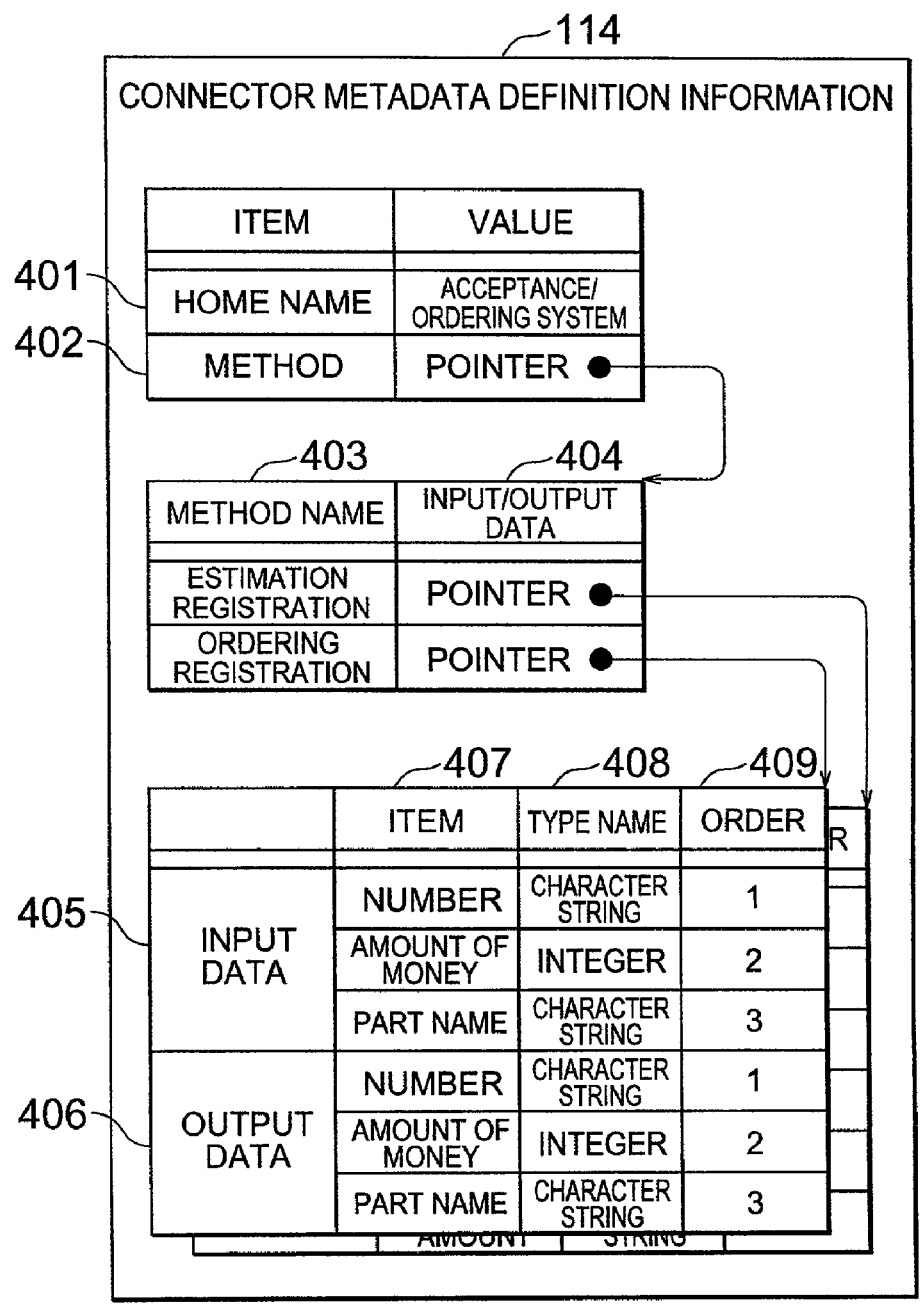
FIG. 4 is a table showing the contents of connector call definition information.

FIG. 4 shows details of the connector metadata definition information 114. The connector metadata definition information 114 is comprised of a home name 401 for a service utilizing program to acquire reference information on the connector component 113; and a method 402 indicative of the contents of each method defined on the connector component 113. The method 402 is comprised of a method name 403 indicative of the name of the method; and input/output data 404 indicative of the contents of input/output data associated with the method. The input/output data 404 is comprised of input data 405 and output data 406, each of which is comprised of an item 407 indicative of a data name of a data item; a type name 408 indicative of the type of the data item; and an order 409 indicative of an order in which the data item appears.

Figure 5:
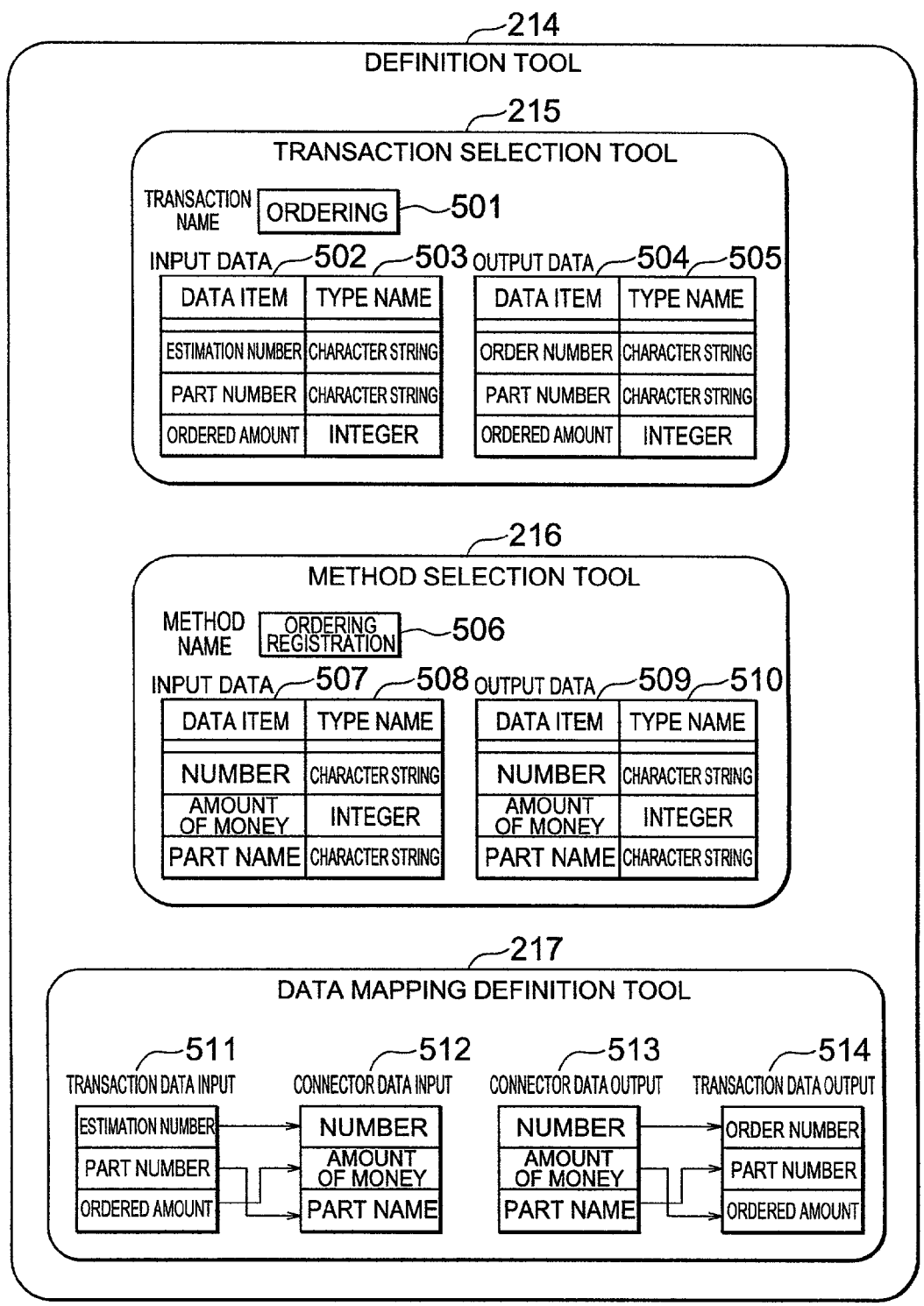
FIG. 5 is a diagram showing an example of definition tool.

FIG. 5 shows an example of the definition tool 214. The definition tool 214 includes a transaction selection tool 215; a transaction processing method definition tool 216; and a data mapping definition tool 217.

The transaction selection tool 215 displays the transaction name 501 indicative of the name of each transaction in the EAI system metadata definition information 102 read by the EAI system metadata definition reading procedure 212; and the contents of the transaction such as data item 502 indicative of the data item name of input data associated with the transaction, type name 503 indicative of the type of the data item, data item 504 indicative of the data item name of output data, type name 505 indicative of the type of the data item, and the like to prompt the user to select a transaction based on the displayed contents. For example, the transaction selection tool 215 displays "estimation", "ordering", "settlement" and the like as the transaction name 501, so that user can select a particular transaction. Assuming that the transaction name 501 selected by the user is "ordering", the transaction selection tool 251 displays "estimation number", "part number", "order amount" and the like which have been defined as input/output data associated with the "ordering" transaction.

The method selection tool 216 displays the method name 506 indicative of the name of each method in the connector metadata definition information 114 read by the connector metadata definition reading procedure 213; and the contents of the method such as the data item 507 indicative of the data item name of input data associated with the method, type name 508 indicative of the type of the data item, data item 509 indicative of the data item name of output data, type name 510 indicative of the type of the data item, and the like to prompt the user to select a method based on the displayed contents. For example, the method selection tool 216 displays "registration of estimation", "registration of ordering" and the like as the method name 506. The user can select a particular method. Assuming that the method name 506 indicates "registration of ordering", the method selection tool 216 displays "number", "amount of money", "part name" and the like which have been defined as input/output data associated with the "ordering" method.

The data mapping definition tool 217 displays a list of the input/output data items associated with the transaction selected by the transaction selection tool 215 and the input/output data items associated with the method selected by the method selection tool 216 to prompt the user to specify the mapping of the data. For example, the user is prompted to map "estimation number" to "number", "part number" to "part", "ordered amount" to "amount of money", and the like.

Figure 6:
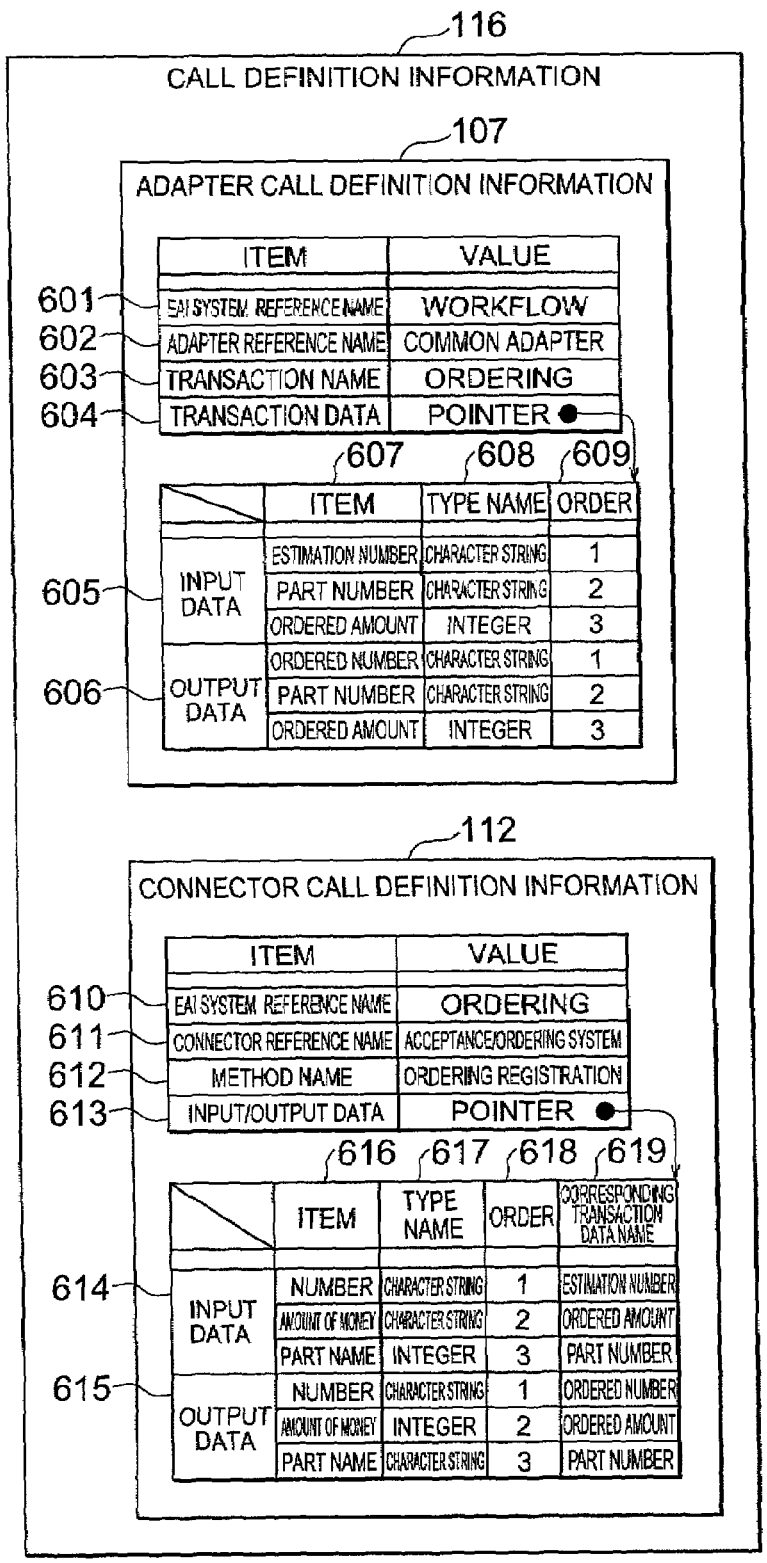
FIG. 6 is a table showing the contents of call definition information in the first embodiment.

FIG. 6 shows details on call definition information 116 which includes the adapter call definition information 107 and the connector call definition information 112. The adapter call definition information 107 is comprised of an EAI system reference name 601 indicative of a reference name of the EAI system 101 for use in receiving a processing request from or returning the result of processing to the EAI system 101; an adapter reference name 602 indicative of a reference name of the adapter component 108 for use in calling the adapter component 108; a transaction name 603 indicative of the name of a transaction selected by the transaction selection tool 215; and transaction data 604 indicative of the contents of input/output data associated with the transaction. Utilized for the EAI system reference name 601 is the value of the EAI system reference name 301 (see FIG. 3) read from the EAI system metadata definition information 102. Also, the transaction data 604 is comprised of input data 605 and output data 606 indicative of input/output data associated with the transaction. The input data 605 and output data 606 are each comprised of an item 607 indicative of a data name of a data item; a type name 608 indicative of the type of the data item; and an order 609 indicative of an order in which the data item appears.

Next, the connector call definition information 112 is comprised of a transaction identification name 610 indicative of the name of a transaction selected by the transaction selection tool 215; a connector reference name 611 indicative of a reference name of the connector component 113 for use in calling the connector component 113; a method name 612 indicative of the name of a method selected by the method selection tool 216; and input/output data 613 indicative of the contents of input/output data associated with the method. Utilized for the connector reference name 611 is the value of the home name 401 (see FIG. 4) read from the connector metadata definition information 114. The input/output data 613 is comprised of input data 614 and output data 615, each of which is comprised of an item 616 indicative of the data name of a data item; a type name 617 indicative of the type of the data item; an order 618 in which the data item appears; and a transaction input/output data item (corresponding transaction data name) 619 defined by the EAI system 101 corresponding to input/output data associated with a transaction method selected by the data mapping definition tool 217.

Figure 7:
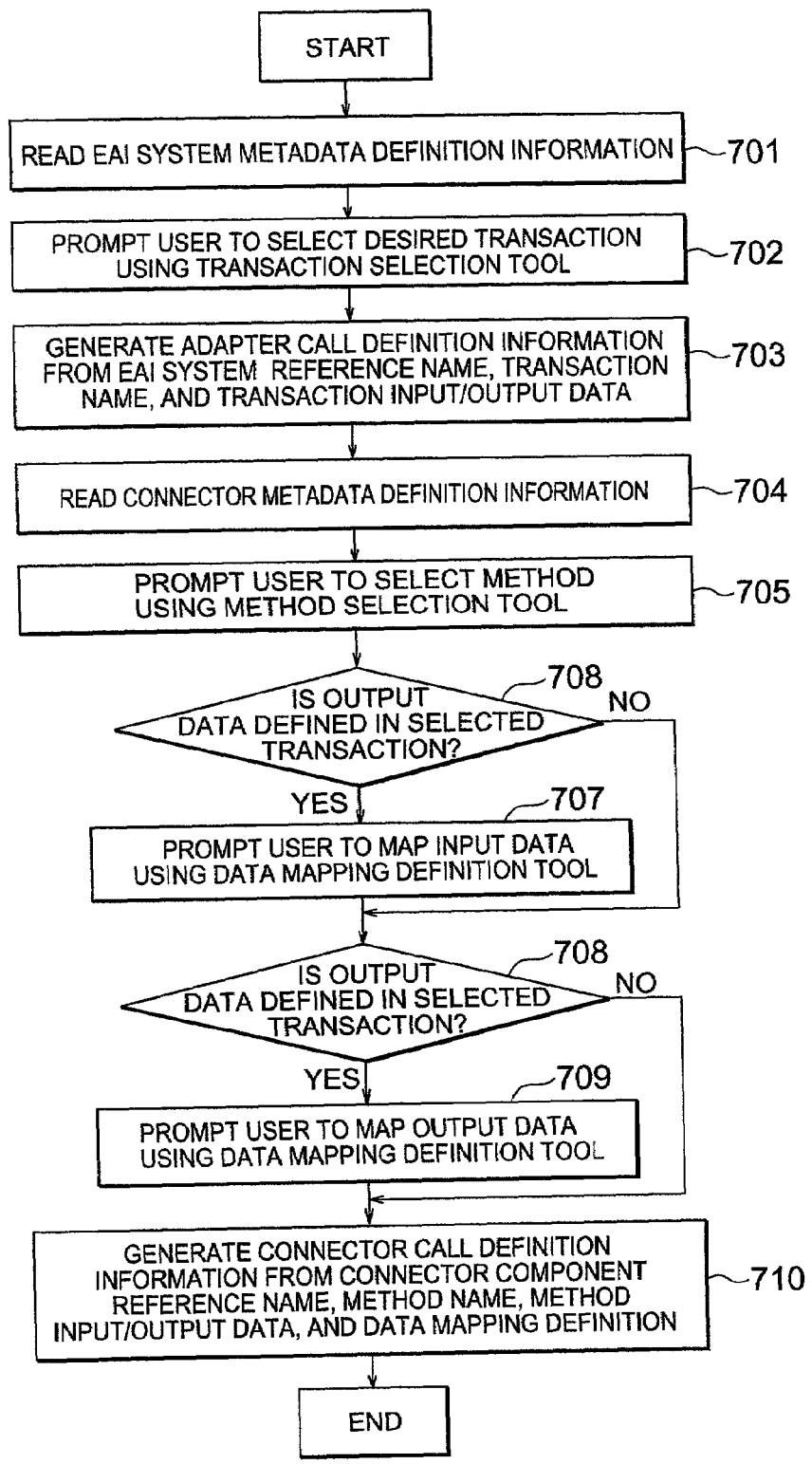
FIG. 7 is a flow chart illustrating the flow of processing performed in the development environment in the first embodiment.

Next, the flow of processing for generating the adapter call definition information 107 and the connector call definition information 112 will be described with reference to FIG. 7.

(Step 701) The EAI system metadata definition reading procedure 212 reads the EAI system metadata definition information 102 from the EAI system 101, and reads meta information of input/output data items communicated between each of transactions defined in the EAI system 101 and the information system responsible for processing each transaction. Taking the meta information for the EAI system metadata definition information 102 in FIG. 3 as an example for purposes of description, the adapter program 126 reads the value "workflow" as the EAI system reference name 301 for returning results to the EAI system 101. Next, the adapter program 126 reads the values "estimation" and "ordering" as the transaction names 303 for the transactions 302 defined on the EAI system 101. Next, the adapter program 126 reads the values "estimation number", "part number" and "ordered amount" as the input/output data (transaction data) 304 for each transaction. The input data 305 and output data 306 are each comprised of items including the item 307, type name 308, and order 309. For example, "estimation number" which is one of items 307 has the type name 308 specified as "character string", and the order 309 of this item in the input data 305 is defined to be "1".

(Step 702) Based on the EAI system metadata definition information 102 read at step 701, the user is prompted to select a desired transaction from among a group of transactions defined in the EAI system metadata definition information 102, using the transaction selection tool 215. Taking the transaction selection tool 215 in FIG. 5 as example for purposes of description, the transaction selection tool 215 displays the transaction name 501, and the data name 502 and type name 503 of input data corresponding to the transaction name 501, the data name 504 and type name 505 of output data corresponding to the transaction names 501, and the like on the screen based on the meta information read from the EAI system metadata definition information 102. Next, the transaction selection tool 215 prompts the user to select a transaction name 501 based on the displayed contents. For example, "estimation", "ordering", "settlement" and the like are displayed as the transaction name 501. The user can select a particular transaction. Assuming that the user selects the transaction name 501 "ordering", the transaction selection tool 215 displays "estimation number", "part number", "ordered amount" and the like which have been defined as input/output data associated with the "ordering" transaction.

(Step 703) The adapter call definition information 107 is generated based on the EAI system metadata definition information 102 read at step 701, and the transaction name selected at step 702. Taking the adapter call definition information 107 in FIG. 6 as an example for purposes of description, the EAI system reference name 601 is taken from "workflow" which is the EAI system reference name 301 in the EAI system metadata definition information 102 read at step 701. The adapter reference name 602 is permanently set to the name "common adapter" such that the adapter component can be referenced by the name "common adapter" upon execution. The transaction name 603, input/output data 604 and the like are taken from values for the transaction selected by the user at step 702. For example, when the user selects "ordering" at step 702, the transaction name 603 is set to "ordering", and items 607 in the input data 605 include "estimation number", "part number" and "ordered amount".

(Step 704) The connector metadata definition reading procedure 213 reads the connector metadata definition information 114 from the connector component 113, and acquires meta information which may include interface information such as the home name of a connector provided by the connector component 113, and input/output data items. Taking the connector metadata definition information 114 in FIG. 4 as an example for describing the meta information, the adapter program 126 reads a value "acceptance/ordering system" as the home name 401 for referencing the connector component 113. Next, the adapter program 126 reads values "registration of estimation" and "registration of ordering" as the method names 403 of methods 402 defined on the EAI system 101. Next, the adapter program 126 reads values "number", "amount of money" and "part name" as the input/output data 404 for each method. The input data 405 and output data 406 are each comprised of items labeled item 407, type name 408 and order 409. For example, the type name 408 of "number" which is one of the items 407 has the type name 408 set as "character string", and the order 409 in the input data 405 set to "1".

(Step 705) Based on the connector metadata definition information 114 read at step 704, the user is prompted to select a transaction processing method which responds to an execution request from the EAI system from among a group of methods provided by the connector component 113, using the method selection tool 216. Taking the method selection tool 216 in FIG. 5 as an example for purposes of description, the method selection tool 216 displays, on the screen, the method name (data item) 506, and the data name 507 and type name 508 of input data corresponding to the method name 506, and the data name 509 and type name 510 of output data corresponding to the method name 506, and the like, based on the meta information read from the connector metadata definition information 114. Next, the user is prompted to select a method name 506 based on the displayed contents. For example, the method selection tool 216 displays "registration of estimation", "registration of ordering" and the like as the method name 506. The user can select a particular method. Assuming that the user selects "registration of ordering" from the method name 506, the method selection tool 216 displays "number", "amount of money", "part name" and the like which have been defined as input/output data associated with the "ordering" method.

(Step 706) It is checked whether or not input data has been defined for the transaction selected at step 702. When input data has been defined, the flow proceeds to step 707, and otherwise to step 708.

(Step 707) The user is prompted to make the mapping between the input data associated with the transaction selected at step 702 and input data associated with the method selected at step 705, using the data mapping definition tool 217. Taking the data mapping definition tool 217 in FIG. 5 as an example for purpose of description, the data mapping definition tool 217 displays input data associated with "ordering", which is the transaction name 501 selected at step 702, as the transaction data input 511. Next, the data mapping definition tool 217 displays input data associated with "registration of ordering", which is the method name 506 selected at step 705, as the connector data input 512. The user is then prompted to make the mapping between respective items of the transaction data input 511 and connector data input 512. For example, the user maps "estimation number" to "number", "part number" to "part name", "ordered amount" to "amount of money", and the like.

(Step 708) It is checked whether or not output data has been defined for the transaction selected at step 702. If output data has been defined, the flow proceeds to step 709, and otherwise to step 710.

(Step 709) The user is prompted to make the mapping between output data associated with the transaction selected at step 702 and output data associated with the transaction processing method selected at step 705, using the data mapping definition tool 217. Taking the data mapping definition tool 217 in FIG. 5 as an example for purposes of description, the data mapping definition tool 217 displays output data associated with "registration of ordering", which is the method name 506 selected at step 705, as the connector data output 513. Next, the data mapping definition tool 217 displays output data associated with "ordering", which is the transaction name 501 selected at step 702, as the transaction data output 514. The user maps data between respective items of the connector data output 513 and transaction data output 514. For example, the user maps "number" to "order number", "amount of money" to "ordered amount", and "part name" to "part number".

(Step 710) Based on the connector metadata definition information 114 read at step 704, method selected at step 705, and data mapping created by the user at steps 706 and 708, the connector call definition information 112 is generated. Taking the connector call definition information 112 in FIG. 6 as an example for purposes of description, the transaction identification name 610 is taken from the transaction name 501 selected at step 702. The connector reference name 611 is taken from "acceptance/ordering system" which is the home reference name 401 of the connector metadata definition information 112 read at step 704. The method name 612, input/output data 613 and the like are taken from values of the method selected by the user at step 705. For example, when the user selects "registration of ordering" at step 705, the method name 612 is set to "registration of ordering", and items 616 of the input data 614 to "number", "amount of money" and "part name". Also, the corresponding transaction data name 619 is taken from the item name of corresponding input/output data defined in the EAI system 101 by the data mapping created by the user at steps 706 and 708. For example, "number" corresponds to "estimation number", "amount of money" to "ordered amount", and "part name" to "part number".

Figure 8:
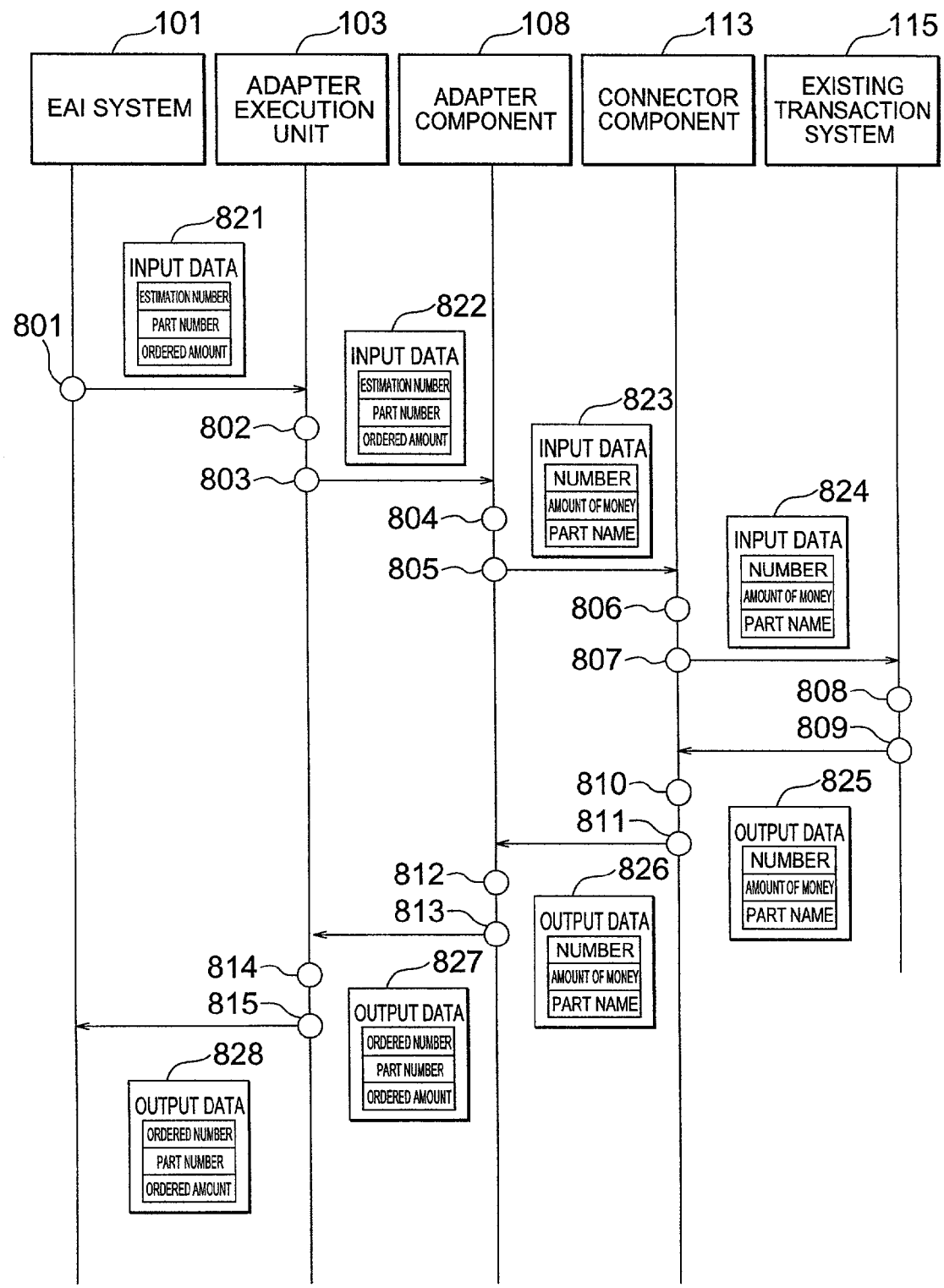
FIG. 8 is a flow chart illustrating the flow of processing performed in the execution environment in the first embodiment.

Next, the flow of execution centered on the EAI system will be described with reference to FIG. 8.

(Step 801) A particular transaction of the EAI system 101 initiates the adapter execution unit 103, and passes input data 821 to the adapter execution unit 103. For example, the ordering 118, which is the transaction defined by the EAI system 101 in FIG. 1, initiates the adapter execution unit 103 responsible for executing the ordering transaction. Then, the ordering 118 passes "estimation number", "part number" and "ordered amount" which are input data indicated by the EAI system metadata definition information 102 in FIG. 3. Assume herein that the input data 821 is in a format determined by the EAI system 101.

(Step 802) The adapter execution unit 103 acquires the reference name of the adapter component 108 commonly used by a plurality of transactions, transaction identification information and metadata definition information for input data, from the adapter call definition information 107. Based on the acquired information, a data format conversion unit 105 of the adapter execution unit 103 converts the input data 821 passed from the EAI system 101 into a format which matches the interface for the adapter component 108. For example, the adapter execution unit 103 acquires "common adapter" which is the adapter reference name 602, "ordering" which is the transaction name 603 serving as the transaction identification information, and values "estimation number", "part number" and "order number" which are input data 605 serving as metadata definition information for the input data, from the adapter call definition information 107 in FIG. 6. Based on the acquired information, the data format conversion unit 105 converts the input data 821.

(Step 803) An adapter connection unit 106 of the adapter execution unit 103 calls the adapter component 108 using the reference name of the adapter component 108, and passes the transaction identification name and the converted input data 822 to the adapter component 108. For example, the adapter connection unit 106 calls the adapter component 108 using "common adapter" which is the adapter reference name 602 acquired at step 802, and passes "ordering", which is the transaction name 603, as the transaction identification name, and "estimation number", "part number" and "order number", which are converted input data 605, as the converted input data 822.

(Step 804) The adapter component 108 selects, based on the transaction identification name, the connection call definition information 112 for calling the connector component 113 for executing the transaction, and acquires, from the connector call definition information 112, a correspondence relationship among the reference name and method name of the connector component 113, metadata definition information for input data, and input data passed from the EAI system 101. Based on the acquired information, a data mapping unit 109 of the adapter component 108 sorts the input data, and a data format conversion unit 110 converts the input data 822 into a format which matches the interface for the connector component 113. For example, the adapter component 108 compares "ordering", which is the transaction identification name passed at step 803, with the transaction identification name 611 in the connector call definition information 112 in FIG. 6, and selects the connector call definition information 112 which has the same transaction identification name. Then, the adapter component 108 acquires "acceptance/ordering system" which is the connector reference name 611, "registration of ordering" which is the method name 612, "number", "amount of money" and "part name" which are the input data 614 serving as metadata definition information for the input data, and values such as the corresponding transaction data name 619 corresponding to each item 616 and the like. Based on the acquired information, the data mapping unit 109 sorts the input data 822 in an order defined by the connector component 113, and the data format conversion unit 110 converts the input data 822 as "number", "amount of money" and "part name".

(Step 805) A connector connection unit 111 of the adapter component 108 calls the connector component 113 using the reference name of the connector component 113, and passes the converted input data 823 to the connector component 113. For example, the connector connection unit 111 calls the ordering transaction connector component 121 in FIG. 1 using "acceptance/ordering system" which is the connector reference name 611 acquired at step 804, and passes "registration of ordering", which is the method name 612, as a method, and "number", "amount of money" and "part name", which are converted input data 614, as the converted input data 823.

(Step 806) The connector component 113 converts the input data 823 into a format which matches an interface for the existing transaction system 115. For example, the ordering transaction connector component 121 in FIG. 1 converts "number", "amount of money" and "part name" which are the input data 823, into a format which matches the interface for the ordering transaction system 124.

(Step 807) The connector component 113 calls the existing transaction system 115, and passes converted input data 824 to the existing transaction system 115. For example, the ordering transaction connector component 121 in FIG. 1 calls the ordering transaction system 124, and passes "number", "amount of money" and "part name", which are the converted input data 824, to the ordering transaction system 124.

(Step 808) The existing transaction system 115 executes transaction processing. For example, the ordering transaction system 124 in FIG. 1 executes the transaction processing using "number", "amount of money" and "part name" which are the input data 824.

(Step 809) The existing transaction system 115 passes output data 825, which is the result of executing the transaction processing, to the connector component 113. For example, the ordering transaction system 124 in FIG. 1 passes "number", "amount of money" and "part name", which are the output data 825, to the ordering transaction connector component 121.

(Step 810) The connector component 113 converts the output data 825 into a format which matches the interface for the connector component 113. For example, the ordering transaction connector component 121 in FIG. 1 converts "number", "amount of money" and "part name" which are the output data 825 passed from the ordering transaction system 124.

(Step 811) The connector component 113 passes converted input data 826 to the adapter component 108. For example, the ordering transaction connector component 121 in FIG. 1 passes "number", "amount of money" and "part name", which are converted output data 826, to the adapter component 108.

(Step 812) The adapter component 108 converts the output data 826 into a format which matches the interface for the adapter component 108, using the connector call definition information 112. For example, the adapter component 108 acquires "number", "amount of money" and "part name" which are output data 615 serving as metadata definition information for output data, and values such as the corresponding transaction data name 619 corresponding to each item 616, and the like, making use of the connector call definition information 112 in FIG. 6. Based on the acquired information, the adapter component 108 sorts the output data 826 in an order defined by the EAI system 101, i.e., in the order of "order number", "part number" and "ordered amount", and converts the output data 826.

(Step 813) The adapter component 108 passes the converted output data 827 to the adapter execution unit 103. For example, the adapter component 108 passes "order number", "part number" and "ordered amount", which are the converted output data 827, to the adapter execution unit 103.

(Step 814) The adapter execution unit 103 converts the output data 827 into a format which matches the interface for the EAI system 101. For example, the adapter execution unit 103 acquires the values of "order number", "part number" and "ordered amount", which are output data 606 serving as metadata definition information for output data, from the adapter call definition information 107 in FIG. 6. The adapter execution unit 103 converts the output data 827 based on the acquired values.

(Step 815) An EAI system connection unit 104 of the adapter execution unit 103 passes converted input data 828 to the EAI system 101. For example, the adapter execution unit 103 calls the EAI system 101 using "workflow" which is the EAI system reference name 601 of the adapter execution unit 103, and passes "order number", "part number" and "ordered amount", which are the converted output data 828, to the EAI system 101.

In the first embodiment, the adapter program 126 comprised of the adapter execution unit 103 and the adapter component 108 is not limited to the reception of an initiation request, including data, from the EAI system 101, but the first embodiment may be applied to a Web application for processing input data from WWW. In this case, each transaction in the EAI system corresponds to an execution request from each screen of WWW, wherein the Web application is required to have metadata definition information, which corresponds to EAI system metadata definition information 102, for input/output data associated with each screen.

Figure 9:
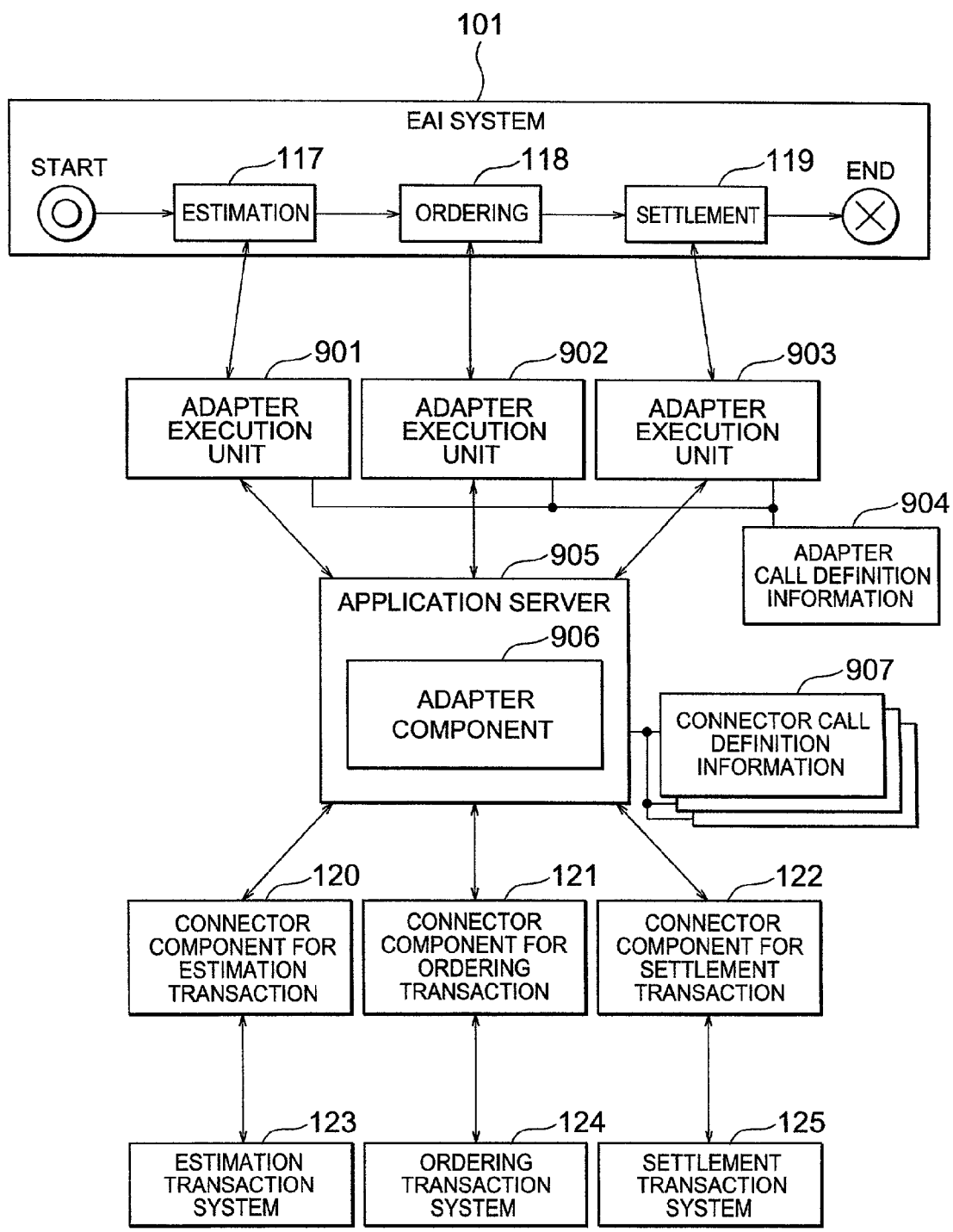
FIG. 9 is a diagram generally illustrating the operation of a program produced by a modification example of the first embodiment.
Figure 10:
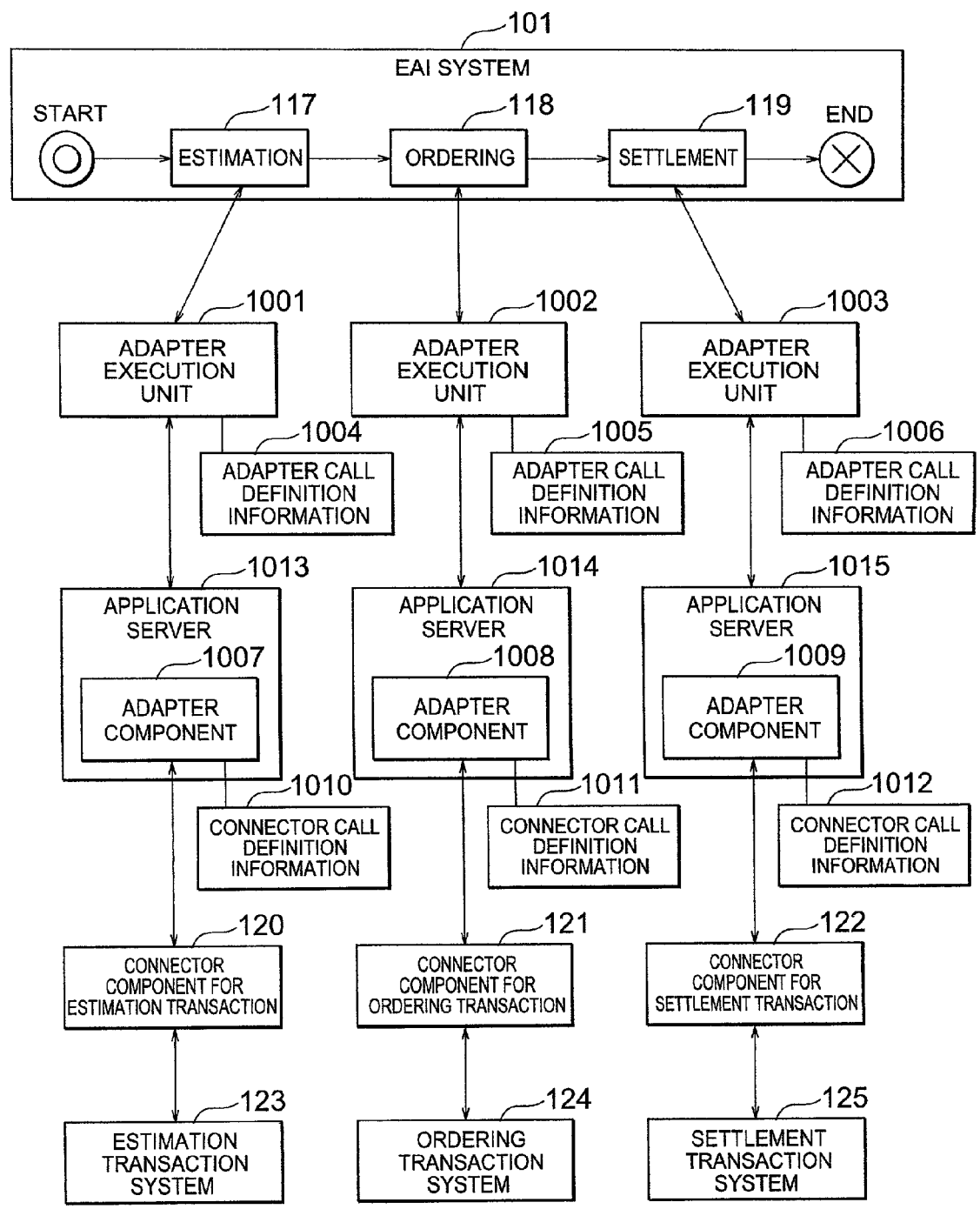
FIG. 10 is a diagram generally illustrating the operation of a program produced in accordance with a second embodiment of the present invention.

Next, a modification example of the first embodiment and a second embodiment will be described with reference to FIGS. 9 and 10. In the first embodiment, a transaction identification name is passed from a single adapter execution unit to an adapter component which selects particular connector call definition information in accordance with the transaction identification name. A modification example of the first embodiment is typically operated in the configuration illustrated in FIG. 9. First, adapter execution units initiated from respective transactions in the EAI system 101 are operated as separate objects, respectively. For example, an adapter execution unit 901 is responsible for executing an estimation 117, an adapter execution unit 902 for executing an ordering 118, and an adapter execution unit 903 for executing a settlement 119. An adapter component 906 is operated as a common object which accepts processing for a plurality of transactions in a single application server 905.

However, high processing performance is occasionally required for a series of information systems centered on an EAI system, in which case a problem may arise in that the adapter component is operated as a common object which accepts processing for a plurality of transactions.

To solve the problem, the second embodiment provides a separate application server for each transaction, and operates an object for an adapter component such that a particular transaction is accepted in the separate application server. The second embodiment is typically operated as illustrated in FIG. 10. Adapter components corresponding to respective transactions of an EAI system 101 are operated as individual objects, i.e., an adapter execution unit 1001, an adapter execution unit 1002 and an adapter execution unit 1003. Also, as adapter call definition information, the adapter execution unit 1001 has adapter call definition information 1004; the adapter execution unit 1002 has adapter call definition information 1005; and the adapter execution unit 1003 has adapter call definition information 1006. Next, the adapter components are operated in separate application servers so as to accept particular transactions. For example, an adapter component 1007 in an application server 1013 is assigned to execute an estimation 117; an adapter component 1008 in an application server 1014 is assigned to execute an ordering 118; and an adapter component 1009 in an application server 1015 is assigned to execute a settlement 119. Further, the adapter component 1007 only calls a connector component for estimation transaction 120; the adapter component 1008 only calls a connector component for ordering transaction 121; and the adapter component 1009 only calls a connector component for settlement transaction 122.

The system configuration, respective definitions, definition tools and flow of processing in the second embodiment are similar to those in the first embodiment. However, since the adapter components 1007, 1008 and 1009 are operated to execute the particular connector components 120, 121 and 122, respectively, there is no need for selecting the connector call definition information 1010, 1011 and 1012 using the transaction identification names. The adapter execution units 1001, 1002 and 1003 are only required to initiate the adapter components 1007, 1008 and 1009 which execute the particular transactions, respectively. Therefore, the transaction identification name 610 may not be included in the connector call definition information 1010, 1011 and 1012.

In the second embodiment, the adapter program comprised of the adapter execution units 1001, 1002 and 1003 and the adapter components 1007, 1008 and 1009 are not limited to the reception of the initiation request, including data, from the EAI system 101, but the second embodiment can also be applied to a Web application for processing input data from WWW. In this case, each transaction in the EAI system corresponds to an execution request from each screen of WWW, wherein the Web application is required to have metadata definition information, which corresponds to the EAI system metadata definition information 102, for input/output data associated with each screen.

According to the present invention, the first embodiment provides an adapter component capable of accepting execution requests for a plurality of transactions from an EAI system and connecting to a plurality of connector components, and an adapter execution unit for accepting an execution request from the EAI system to initiate the adapter component, so that a programmer dedicated to the development of an adapter program need not be familiar with a plurality of component models. In addition, the provision of the foregoing components can result in a reduction in the number of steps in the system development, and an improved maintenanceability for programs.

In the second embodiment, the adapter component is operated to accept an execution request for a particular transaction and connect to a particular connector component, so that higher processing performance is expected.

As will be appreciated from the foregoing, according to the present invention, the maintenanceability for programs can be improved by providing an adapter component capable of connecting to a plurality of connector components, and an adapter execution unit for accepting an execution request from an EAI system and initiating an adapter component.

It will be further understood by those skilled in the art that the foregoing description has been made on embodiments of the invention and that various changes and modifications may be made in the invention without departing from the spirit of the invention and scope of the appended claims.

What is claimed is:

1. A program control method executed by a computer for converting data outputted from a first program into a format available for a second program, comprising:
receiving data outputted from particular transaction processing of the first program by an adapter execution unit being executable in the computer for responding to an execution request from said first program;
referencing adapter call definition information for calling an adapter component for use in common with a plurality of transactions, said adapter component being adapted to connect the second program and being executable for controlling the second program in the computer;
acquiring, by the adapter execution unit, an adapter component reference name for indicating adapter component reference information corresponding to said particular transaction and transaction identification information for indicating identification information of the second program;
converting, by the adapter execution unit, said data into a data format for a predetermined interface defined by said adapter component to generate first converted data;
initiating an adapter component corresponding to said adapter component reference name;
outputting said transaction identification information and said first converted data from the adapter execution unit to the adapter component;
receiving said transaction identification information outputted from said adapter execution unit and said first converted data as inputs to the adapter component;
referencing connector call definition information for calling the second program based on said transaction identification information;
acquiring, by the adapter component, a connector component reference name for indicating reference information of the second program and a method name corresponding to said particular transaction processing;
converting, by the adapter component, said first converted data into a data format for a predetermined interface defined by said second program to generate second converted data;
initiating the method of said second program corresponding to said connector component reference name; and
outputting said second converted data from the adapter component to the second program,
wherein said first program designates execution of a plurality of transactions and has a metadata definition for defining transactions and a data format of each transaction, and
wherein said second program has a metadata definition for defining a method of an existing transaction and a data format of the method for employing the existing transaction.

2. A program control method according to claim 1, wherein:
said first program is applied with a workflow engine for associating a plurality of transaction systems;
said second program is applied with a component based on a J2EE Connector component model; and
said adapter component is applied with a component based on an Enterprise JavaBeans component model.

3. A program control method according to claim 1, wherein:
said first program is applied with a hub-and-spoke system for associating a plurality of transaction systems;
said second program is applied with a component based on a J2EE Connector component model; and
said adapter component is applied with a component based on an Enterprise JavaBeans component model.

4. A program control method according to claim 1, wherein:
said first program is applied with a Web application for processing input data from WWW;
said second program is applied with a component based on a J2EE Connector component model; and
said adapter component is applied with a component based on an Enterprise JavaBeans component model.

5. A program control method executed by a computer for converting data outputted from a first program into a format available for a second program, comprising:
receiving data outputted from particular transaction processing of the first program by an adapter execution unit being executable in the computer for responding to an execution request from said first program;
referencing adapter call definition information for calling an adapter component for use in a particular transaction, said adapter component being adapted to connect the second program and being executable for controlling the second program in the computer;
acquiring, by the adapter execution unit, an adapter component reference name for indicating adapter component reference information corresponding to said particular transaction processing;
converting, by the adapter execution unit, said data into a data format for a predetermined interface defined by said adapter component to generate first converted data;
initiating an adapter component corresponding to said adapter component reference name;
outputting said first converted data from the adapter execution unit to the adapter component;
receiving said first converted data outputted from the adapter execution unit to the adapter component;
referencing connector call definition information for calling the second program;
acquiring, by the adapter component, a connector component reference name for indicating reference information of the second program and a method name corresponding to said particular transaction processing;
converting, by the adapter component, said first converted data into a data format for a predetermined interface defined by said second program to generate second converted data;
initiating the method of said second program corresponding to said connector component reference name; and
outputting said second converted data from the adapter component to the second program,
wherein said first program designates execution of a plurality of transactions and has a metadata definition for defining transactions and a data format of each transaction, and
wherein a second program has a metadata definition for defining a method of an existing transaction and a data format of the method for employing the existing transaction.

6. A program control method executed by a computer for converting data outputted from a first program into a format available for a second program, comprising the steps of:
receiving data outputted from particular transaction processing of said first program by an adapter execution unit being executable in the computer for responding to an execution request from said first program;
acquiring, by the adapter execution unit, an adapter component reference name for indicating adapter component reference information corresponding to said particular transaction with reference to adapter call definition information for calling an adapter component for use in common with a plurality of transactions, said adapter component being adapted to connect the second program and being executable for controlling the second program in the computer;
acquiring, by the adapter execution unit, transaction identification information for indicating identification information of the second program with reference to said adapter call definition information;
converting, by the adapter execution unit, said data into a format, which matches an interface for said adapter component, to generate first converted data;
passing said transaction identification information and said first converted data to said adapter component;
selecting, by said adapter component, connector call definition information for calling said second program, based on said transaction identification information;
acquiring, by said adapter component, a connector reference name for indicating reference information of the second program and a method name corresponding to said particular transaction processing with reference to said connector call definition information;
converting, by the adapter component, said first converted data into a format, which matches an interface for said second program, to generate second converted data; and
passing said second converted data to said second program corresponding to said connector reference name,
wherein said first program designates execution of a plurality of transactions and has a metadata definition for defining transactions and a data format of each transaction, and
wherein said second program has a metadata definition for defining a method of an exiting transaction and a data format of the method for employing the existing transaction.

7. A program control method according to claim 6, wherein:
said first program is applied with a workflow program for associating a plurality of transaction systems;
said second program is applied with a component based on a J2EE Connector component model; and
said adapter component is applied with a component based on an Enterprise JavaBeans component model.

8. A program control method according to claim 6, wherein:
said first program is applied with a hub-and-spoke system for associating a plurality of transaction systems;
said second program is applied with a component based on a J2EE Connector component model; and
said adapter component is applied with a component based on an Enterprise JavaBeans component model.

9. A program control method according to claim 6, wherein:
said first program is applied with a Web application for processing input data from WWW;
said second program is applied with a component based on a J2EE Connector component model; and
said adapter component is applied with a component based on an Enterprise JavaBeans component model.

10. A program control method executed by a computer for converting data outputted from a first program into a format available for a second program, comprising the steps of:
receiving an initiation request from said first program by an adapter execution unit being executable in the computer for responding to an execution request from said first program, said initiation request including data;
acquiring, by the adapter execution unit, an adapter component reference name for indicating adapter component reference information corresponding to particular transaction processing with reference to adapter call definition information for calling an adapter component for use in a particular transaction in the adapter execution unit initiated based on said initiation request, said adapter component being adapted to connect the second program and being executable for controlling the second program in the computer;
converting, by the adapter execution unit, said data into a format, which matches an interface for said adapter component, to generate first converted data;
passing said first converted data to said adapter component;
acquiring, by the adapter component, a connector component reference name for indicating reference information of the second program and a method name corresponding to said particular transaction processing with reference to connector call definition information for calling said second program;
converting, by the adapter component, said first converted data into a format, which matches an interface for said second program, to generate second converted data; and
passing said second converted data to said second program corresponding to said connector reference name,
wherein said first program designates execution of a plurality of transactions and has a metadata definition for defining transactions and a data format of each transaction, and
wherein said second program has a metadata definition for defining a method of an existing transaction and a data format of the method for employing the existing transaction.

11. A computer system comprising adapter program executing means for receiving data outputted from a first program executing means, converting said data into a format available for a second program executing means, and outputting said converted data to said second program executing means, wherein:
said adapter program executing means includes:
means for receiving said data outputted by particular transaction processing of said first program executing means;
means for acquiring an adapter component reference name for indicating adapter component reference information corresponding to said particular transaction with reference to adapter call definition information for calling adapter component executing means for use in common with a plurality of transactions;
means for acquiring transaction identification information for indicating identification information of the second program executing means with reference to said adapter call definition information;

means for converting said data into a format, which matches an interface for said adapter component executing means, to generate first converted data;

means for passing said transaction identification information and said first converted data to said adapter component executing means;

means for selecting connector call definition information for initiating said second program executing means based on said transaction identification information;

means for acquiring a connector reference name for indicating reference information of the second program executing means and a method name with reference to said connector call definition information;

means for converting said first converted data into a format, which matches an interface for said second program executing means, to generate second converted data; and means for passing said second converted data to said second program executing means corresponding to said connector reference name, wherein said first program executing means designates execution of a plurality of transactions and has a metadata definition for defining transactions and a data format of each transaction, and wherein said second program executing means has a metadata definition for defining a method of an existing transaction and a data format of the method for employing the existing transaction.

12. A computer readable recording medium storing a control program, said control program having an adapter program which receives data outputted from a first program as an input, converts said data into a format available for a second program, and outputs said converted data to said second program, wherein:

said adapter program comprising an adapter execution unit being executable in the computer for responding to an execution request from said first program and an adapter component being capable of connecting the second program and being executable for controlling the second program in the computer, said adapter execution unit comprising the steps of:

receiving data outputted by particular transaction processing of said first program;

acquiring an adapter component reference name for indicating adapter component reference information corresponding to said particular transaction with reference to adapter call definition information for calling an adapter component for use in common with a plurality of transactions;

acquiring transaction identification information for indicating identification information of the second program with reference to said adapter call definition information;

converting said data into a format, which matches an interface for said adapter component, to generate first converted data; and passing said transaction identification information and said first converted data to said adapter component, said adapter component comprising the steps of:

selecting a connector call definition information for calling said second program, based on said transaction identification information;

acquiring a connector component reference name for indicating reference information of the second program and a method name with reference to said connector call definition information;

converting said first converted data into a format, which matches an interface for said second program, to generate second converted data; and passing said second converted data to said second program corresponding to said connector reference name, wherein said first program designates execution of a plurality of transactions and has a metadata definition for defining transactions and a data format of each transaction, and wherein said second program has a metadata definition for defining a method of an existing transaction and a data format of the method for employing the existing transaction.

* * * * *